(12) United States Patent
Liu et al.

(10) Patent No.: US 12,223,330 B2
(45) Date of Patent: Feb. 11, 2025

(54) BIOS SETUP ENVIRONMENT CONFIGURATION MODIFICATION AUDIT SYSTEM

(71) Applicant: Dell Products L.P., Round Rock, TX (US)

(72) Inventors: Wei Liu, Austin, TX (US); Chih-Chao Liu, Taipei (TW); Gin Yen Yang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 18/302,163

(22) Filed: Apr. 18, 2023

(65) Prior Publication Data

US 2024/0354114 A1 Oct. 24, 2024

(51) Int. Cl.
*G06F 9/4401* (2018.01)
(52) U.S. Cl.
CPC .................................. *G06F 9/4403* (2013.01)
(58) Field of Classification Search
CPC .................................................... G06F 9/4403
See application file for complete search history.

(56) References Cited

U.S. PATENT DOCUMENTS

| 8,078,865 B2 | 12/2011 | Brumley et al. | |
| 2007/0255936 A1* | 11/2007 | Stemen | G06F 9/4411 713/2 |
| 2015/0154092 A1* | 6/2015 | Chen | G06F 9/4401 713/2 |
| 2015/0277895 A1* | 10/2015 | Samuel | G06F 9/4411 713/1 |
| 2020/0241884 A1* | 7/2020 | Li | G06F 9/44505 |
| 2020/0301714 A1* | 9/2020 | Dasar | G06F 3/0658 |
| 2021/0373903 A1* | 12/2021 | Nelson | G06F 21/572 |
| 2021/0397459 A1* | 12/2021 | Tsao | G06F 9/44505 |

* cited by examiner

*Primary Examiner* — Glenn A. Auve
(74) *Attorney, Agent, or Firm* — Joseph Mencher

(57) ABSTRACT

A BIOS setup environment configuration modification audit system includes a BIOS device that is included in a computing device and that is coupled to a component device in the computing device. The BIOS device enters a BIOS setup environment for the computing device and, while in the BIOS setup environment, detects component device configuration modification(s) to a configuration of the component device. The BIOS device then generates component device configuration modification information for the component device configuration modification(s) to the configuration of the component device, and provides the component device configuration modification information for storage in a non-volatile storage device that may be included in the BIOS device, a Baseboard Management Controller (BMC) device coupled to the BIOS device, or a network-connected device coupled to the BIOS device, any of which may provide access to that component device configuration modification information in response to a component device configuration audit request.

20 Claims, 12 Drawing Sheets

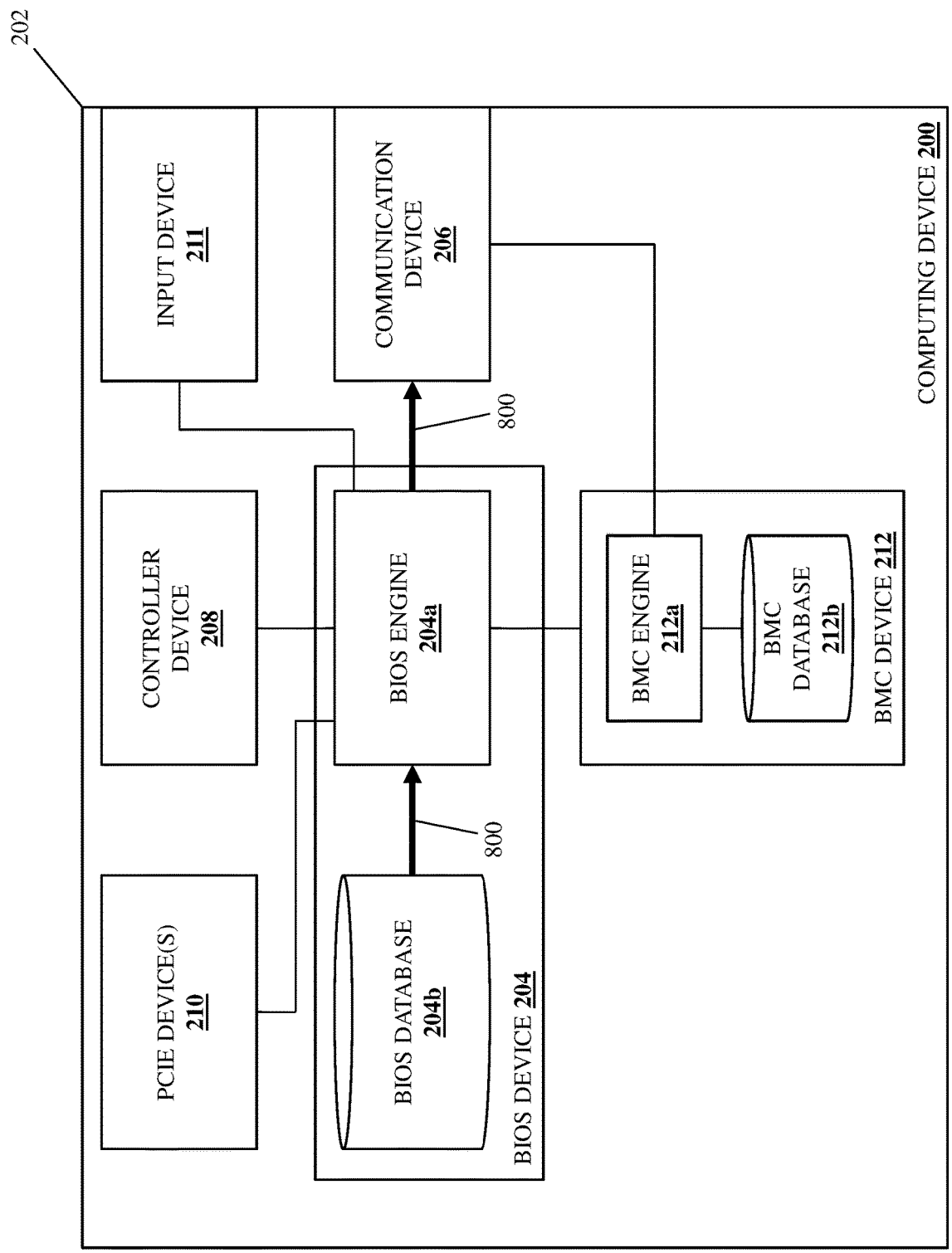

BIOS SETUP ENVIRONMENT CONFIGURATION MODIFICATION AUDIT SYSTEM

BACKGROUND

The present disclosure relates generally to information handling systems, and more particularly to enabling audits for configuration modifications performed in a Basic Input/Output System (BIOS) setup environment of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, may include a variety of component devices that each may be configured in a variety of manners. One technique for configuring (or reconfiguring) a component device in a computing device is via a BIOS setup environment of the computing device that may be entered by, for example, pressing an "F2" key on an input device coupled to the computing device during a boot process for that computing device. Once in the BIOS setup environment, the configuration of the component device may then be provided/modified and committed to the component device such that the component device will subsequently operate according to that configuration.

However, the configuration of component devices in a computing device while in the BIOS setup environment discussed above raises issues, as modifications made to a first configuration of a component device to provide a second configuration of the component device are not conventionally captured while in the BIOS setup environment, thus preventing subsequent audits of the configuration and configuration modifications associated with that component device. As will be appreciated by one of skill in the art in possession of the present disclosure, the lack of the ability to audit the configuration and configuration modifications associated with component devices in a computing device is a particular issue in situations in which the computing device is not "owned" by a user of the computing device that performs those configurations/configuration modifications (e.g., computing devices rented to such users, computing devices provided at the edge of a network utilized by such users, computing devices used to provide cloud services to such users, etc.). As such, component device configurations provided in such conventional BIOS setup environment component configuration systems can require time consuming and inefficient troubleshooting in the event that component device configurations configure component devices in an undesired manner.

Accordingly, it would be desirable to provide a BIOS setup environment component configuration system that addresses the issues discussed above.

SUMMARY

According to one embodiment, an Information Handling System (IHS) includes a Basic Input/Output System (BIOS) processing system; and a BIOS memory system that is coupled to the BIOS processing system and that includes instructions that, when executed by the BIOS processing system, cause the BIOS processing system to provide a BIOS engine that is configured to: enter a BIOS setup environment; detect, while in the BIOS setup environment, at least one component device configuration modification to a configuration of a component device that is coupled to the BIOS processing system; generate component device configuration modification information for the at least one component device configuration modification to the configuration of the component device; and provide the component device configuration modification information for storage in a non-volatile storage device.

BRIEF DESCRIPTION OF THE DRAWINGS

FIG. 8A is a schematic view illustrating an embodiment of the computing device of FIG. 2 operating during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
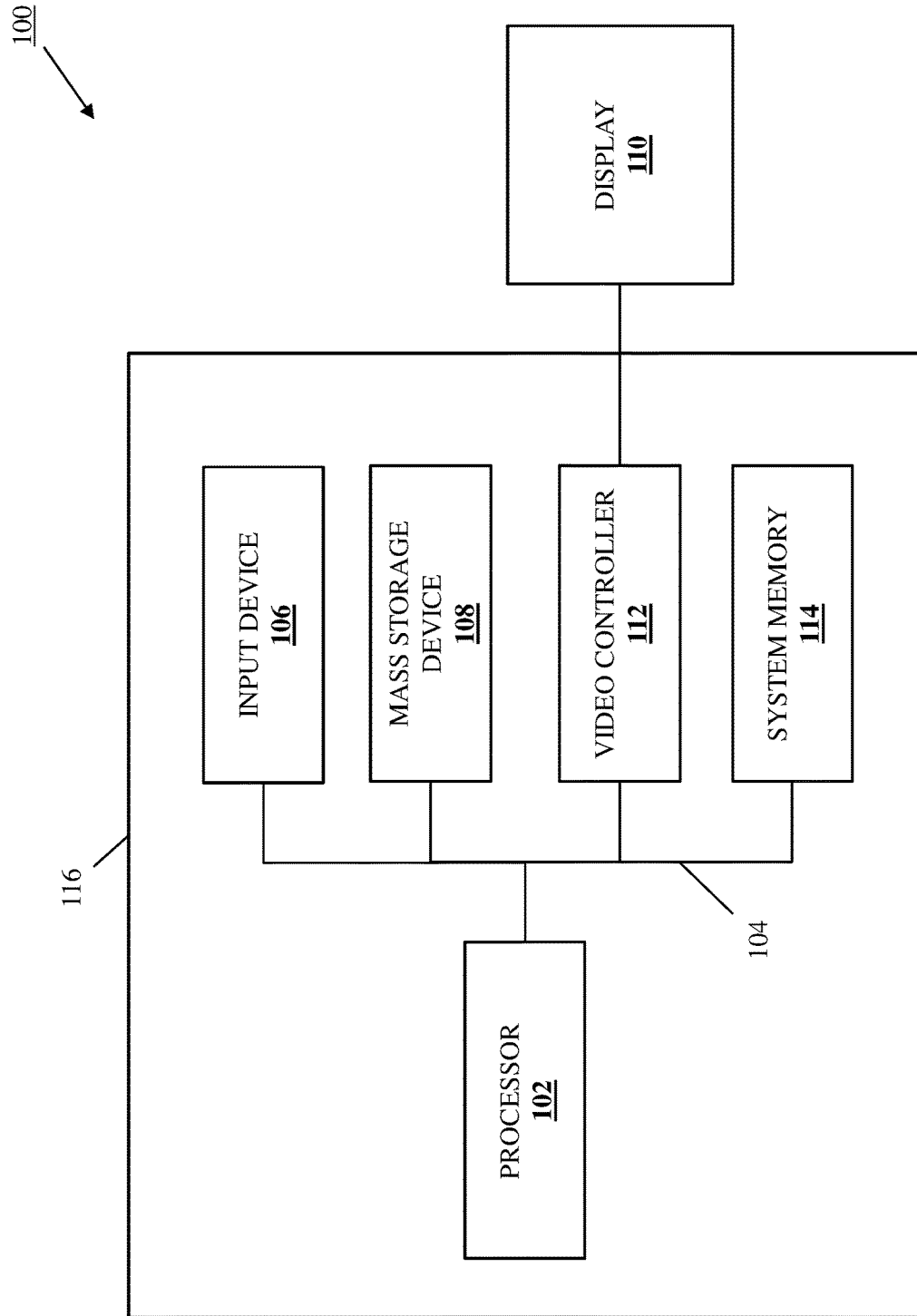
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
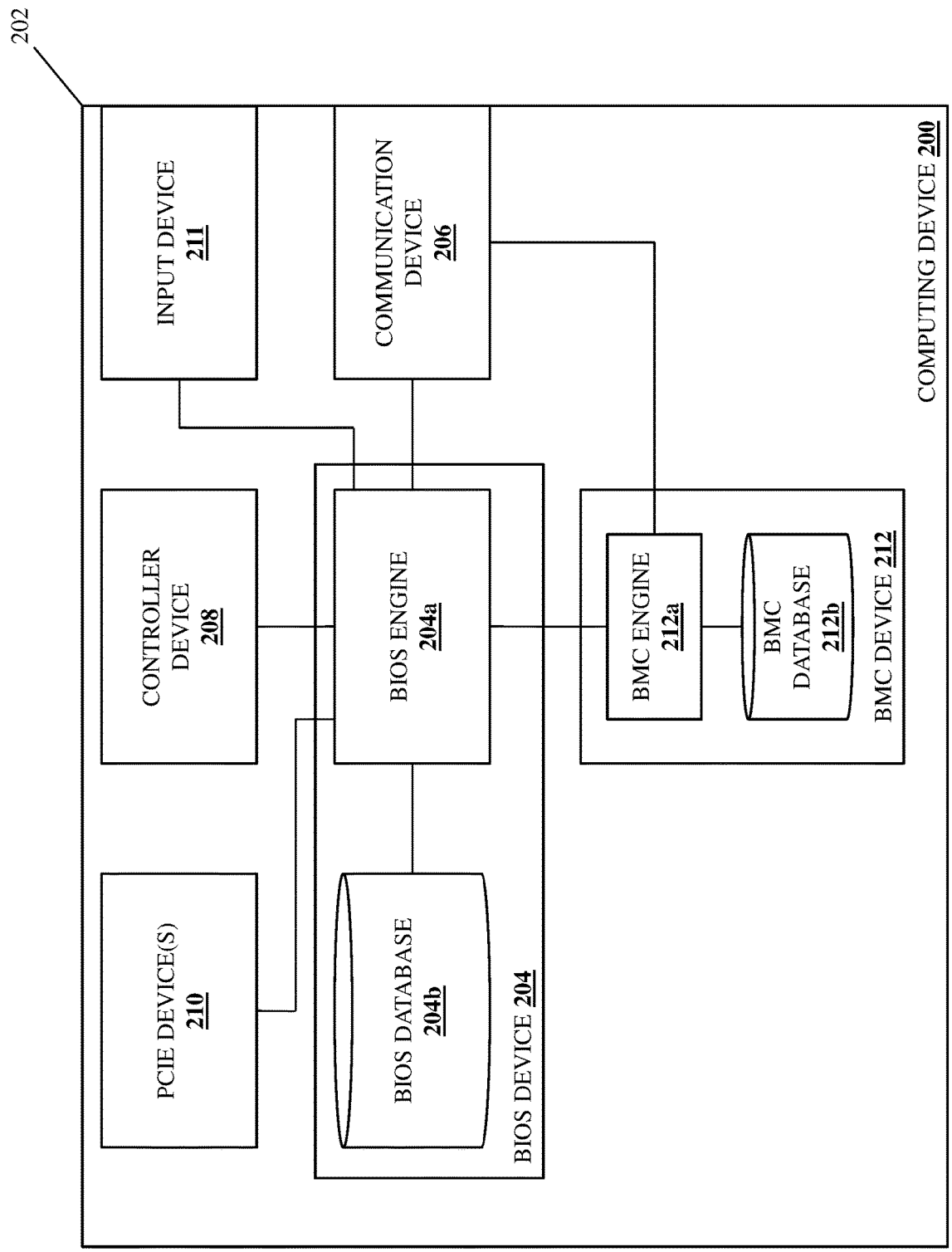
FIG. 2 is a schematic view illustrating an embodiment of a computing device that may include the BIOS setup environment configuration modification audit system of the present disclosure.
Figure 3:
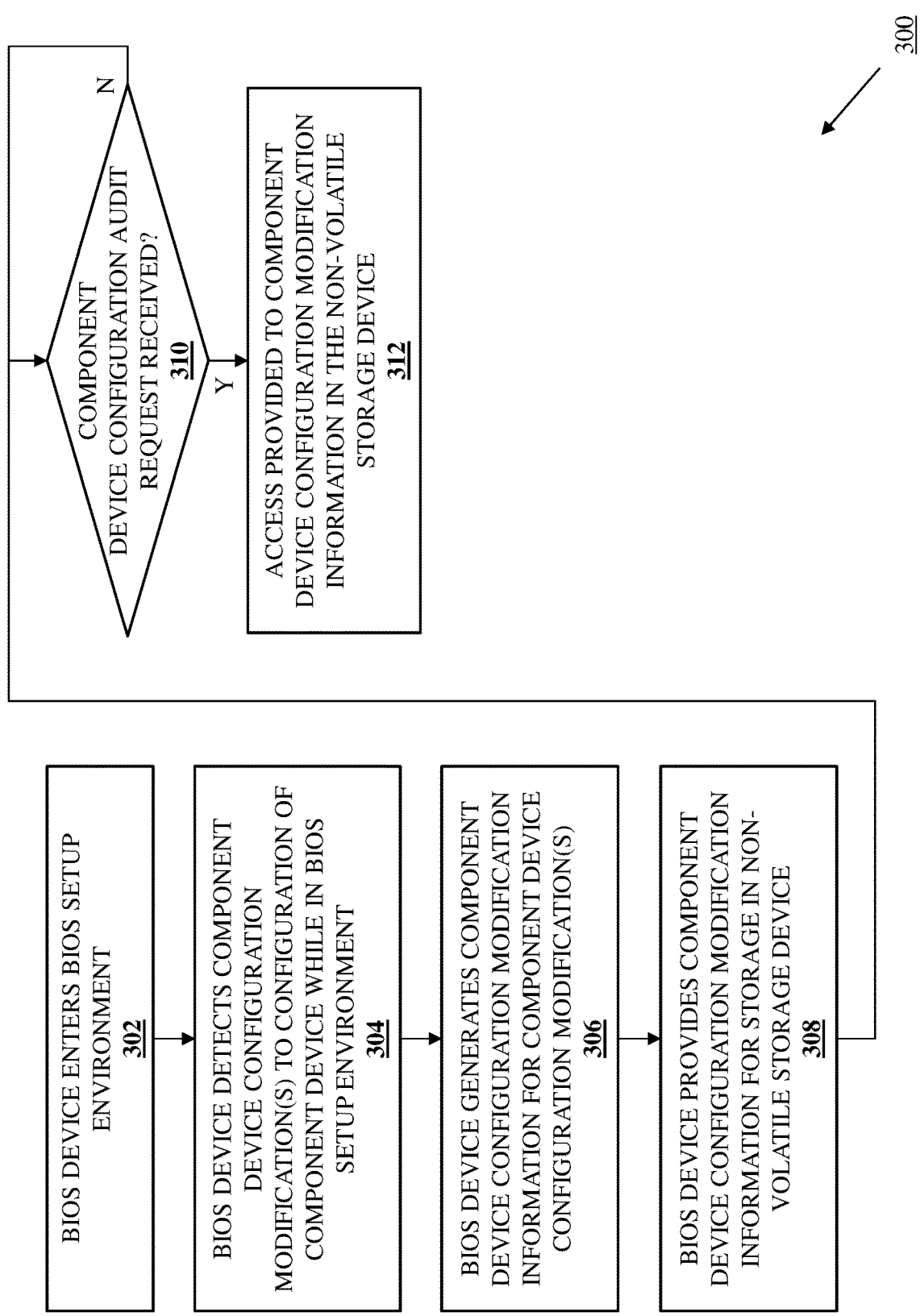
FIG. 3 is a flow chart illustrating an embodiment of a method for enabling audits of configurations modification performed in a BIOS setup environment of a computing device.

Referring now to FIG. 2, an embodiment of a computing device 200 is illustrated that may include the BIOS setup environment configuration modification audit system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses component devices of the computing device 200, only some of which are illustrated and described below.

For example, the chassis 202 may house a component device that is provided by a Basic Input/Output System (BIOS) device 204 that may include a BIOS processing system (not illustrated, but which may include a processor similar to the processor 102 discussed above with reference to FIG. 1) and a BIOS memory system (not illustrated, but which may include a memory similar to the memory 114 discussed above with reference to FIG. 1) that is coupled to the BIOS processing system and that includes instructions that, when executed by the BIOS processing system, cause the BIOS processing system to provide a BIOS engine 204a that is configured to perform the functionality of the BIOS engines, BIOS subsystems, and/or computing devices discussed below. As illustrated, the BIOS device 204 may also house a BIOS storage system (not illustrated, but which may include a storage similar to the storage 108 discussed above with reference to FIG. 1) that is coupled to the BIOS engine 204a (e.g., via a coupling between the BIOS storage system and the BIOS processing system) and that includes a BIOS database 204b that is configured to store any of the information utilized by the BIOS engine 204a discussed below.

To provide a specific example, the BIOS device 204 may be provided by BIOS firmware, although one of skill in the art in possession of the present disclosure will appreciate that the functionality of the BIOS device 204 may be provided by other processing/memory/storage system combinations while remaining within the scope of the present disclosure as well. Furthermore, while illustrated and described as a "BIOS" device, one of skill in the art in possession of the present disclosure will appreciate how the BIOS device 204 may be provided by a Unified Extensible Firmware Interface (UEFI) device that may be provided to replace the BIOS device 204 in the computing device 200 according to UEFI specifications that define an architecture of platform firmware used for booting and its interface for interaction with an operating system in the computing device 200.

The chassis 202 may also house a component device that is provided by a communication device 206 that is coupled to the BIOS engine 204a in the BIOS device 204 (e.g., via a coupling between the communication device 206 and the BIOS processing system) and that may be provided by a Network Interface Controller (NIC) device and/or other communication devices that would be apparent to one of skill in the art in possession of the present disclosure. In some specific examples, the communication device 206 and the BIOS device 204 may include one or more Human Interface Infrastructure (HII) subsystems (e.g., HII interfaces) for allowing the configuration of the communication device 206 via the BIOS engine 204a as described below. The chassis 202 may also house a component device that is provided by a controller device 208 that is coupled to the BIOS engine 204a in the BIOS device 204 (e.g., via a coupling between the controller device 208 and the BIOS processing system) and that may be provided by a Power-Edge® Redundant Array of Independent Disk (RAID) Controller (PERC) device available from DELL® Inc. of Round Rock, Texas, United States, and/or other controller devices that would be apparent to one of skill in the art in possession of the present disclosure. In some specific examples, the controller device 208 and the BIOS device 204 may include one or more HII subsystems (e.g., HII interfaces) for allowing the configuration of the controller device 208 via the BIOS engine 204a as described below.

The chassis 202 may also house one or more component devices that are provided by Peripheral Component Interconnect express (PCIe) device(s) 210 that are coupled to the BIOS engine 204a in the BIOS device 204 (e.g., via a coupling between the PCIe device(s) 210 and the BIOS processing system) and that may be provided by Non-Volatile Memory express (NVMe) storage devices and/or other PCIe devices that would be apparent to one of skill in the art in possession of the present disclosure. In some specific examples, each of the PCIe device(s) 210 and the BIOS device 204 may include one or more HII subsystems (e.g., HII interfaces) for allowing the configuration of the PCIe device(s) 210 via the BIOS engine 204a as described below. The chassis 202 may also house (or be coupled to) an input device 211 that is coupled to the BIOS engine 204a in the BIOS device 204 (e.g., via a coupling between the input device and the BIOS processing system) and that may be provided by the input device 106 discussed above with reference to FIG. 1, and/or other input devices that would be apparent to one of skill in the art in possession of the present disclosure.

The chassis 202 may also house a component device that is provided by a Baseboard Management Controller (BMC) device 212 that may be provided by an integrated DELL® Remote Access Controller (iDRAC) device provided in server devices available from DELL® Inc. of Round Rock, Texas, United States, as well as any other BMC devices that would be apparent to one of skill in the art in possession of the present disclosure. In the illustrated embodiment, the BMC device 212 includes a BMC processing system (not illustrated, but which may include a processor similar to the processor 102 discussed above with reference to FIG. 1) and a BMC memory system (not illustrated, but which may include a memory similar to the memory 114 discussed above with reference to FIG. 1) that is coupled to the BMC processing system and that includes instructions that, when executed by the BMC processing system, cause the BMC processing system to provide a BMC engine 212a that is configured to perform the functionality of the BMC engines, BMC subsystems, and/or computing devices discussed below. As illustrated, the BMC engine 212a is coupled to the BIOS engine 204a in the BIOS device 204 (e.g., via a coupling between the BMC processing system and the BIOS processing system), and coupled to the communication device 206 (e.g., via a coupling between the BMC processing system and the communication device 206).

The BMC device 212 may also house a BMC storage system (not illustrated, but which may include a storage similar to the storage 108 discussed above with reference to FIG. 1) that is coupled to the BMC engine 212a (e.g., via a coupling between the BMC storage system and the BMC processing system) and that includes a BMC database 212b that is configured to store any of the information utilized by the BMC engine 212a discussed below. In some specific examples, the BMC device 212 and the BIOS device 204 may include one or more HII subsystems (e.g., HII interfaces) for allowing the configuration of the BMC device 212 via the BIOS engine 204a as described below.

However, while a variety of particular components devices have been illustrated and described as being included in the computing device 200, one of skill in the art in possession of the present disclosure will appreciate how other types of component devices may be included in and/or coupled to the computing device 200 and may have any of their associated component device configuration modifications stored for the purposes of audits as described below while remaining within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS setup environment configuration modification audit functionality discussed below, while remaining within the scope of the present disclosure as well.

Referring now to FIG. 4, an embodiment of a method 300 for enabling audits of configurations modification performed in a Basic Input/Output System (BIOS) setup environment of a computing device is illustrated. As discussed below, the systems and methods of the present disclosure provide computing devices with a BIOS device that, when modifications are made to the configuration of component device(s) while in a BIOS setup environment for the computing device, generates component device configuration modification information for those modifications and provides it for storage in a non-volatile memory device. For example, the BIOS setup environment configuration modification audit system of the present disclosure includes a BIOS device that is included in a computing device and that is coupled to a component device in the computing device. The BIOS device enters a BIOS setup environment for the computing device and, while in the BIOS setup environment, detects component device configuration modification(s) to a configuration of the component device. The BIOS device then generates component device configuration modification information for the component device configuration modification(s) to the configuration of the component device, and provides the component device configuration modification information for storage in a non-volatile storage device that may be included in the BIOS device, a Baseboard Management Controller (BMC) device coupled to the BIOS device, or a network-connected device coupled to the BIOS device, any of which may subsequently provide access to that component device configuration modification information in response to a component device configuration audit request. As such, modifications made during a BIOS setup environment to configurations of component devices in a computing device may be audited to identify any details about those configuration modifications, which may be particularly useful in situations where the user making such modifications is not the "owner" of the computing device.

Figure 4A:
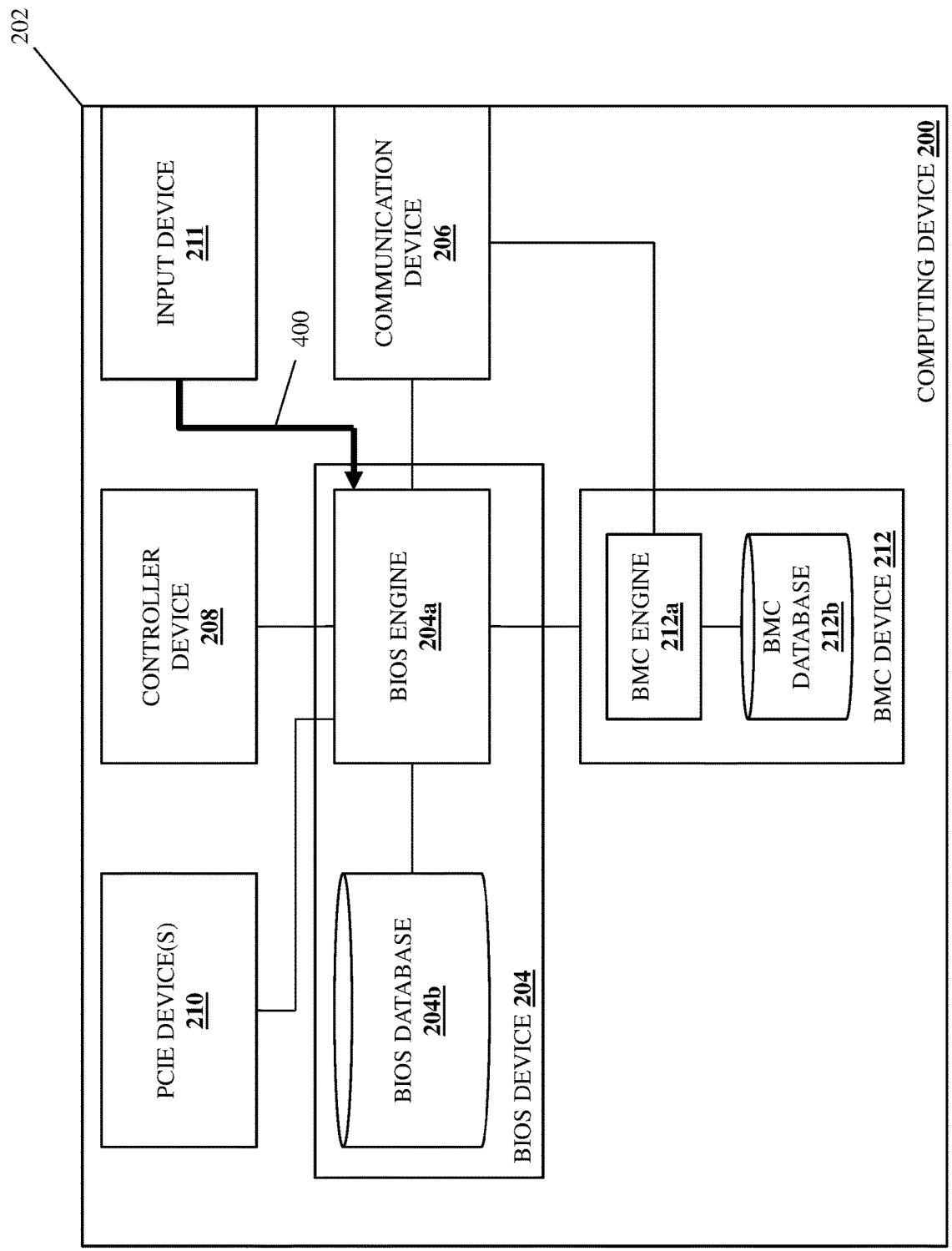
FIG. 4A is a schematic view illustrating an embodiment of the computing device of FIG. 2 operating during the method of FIG. 3.
Figure 4B:
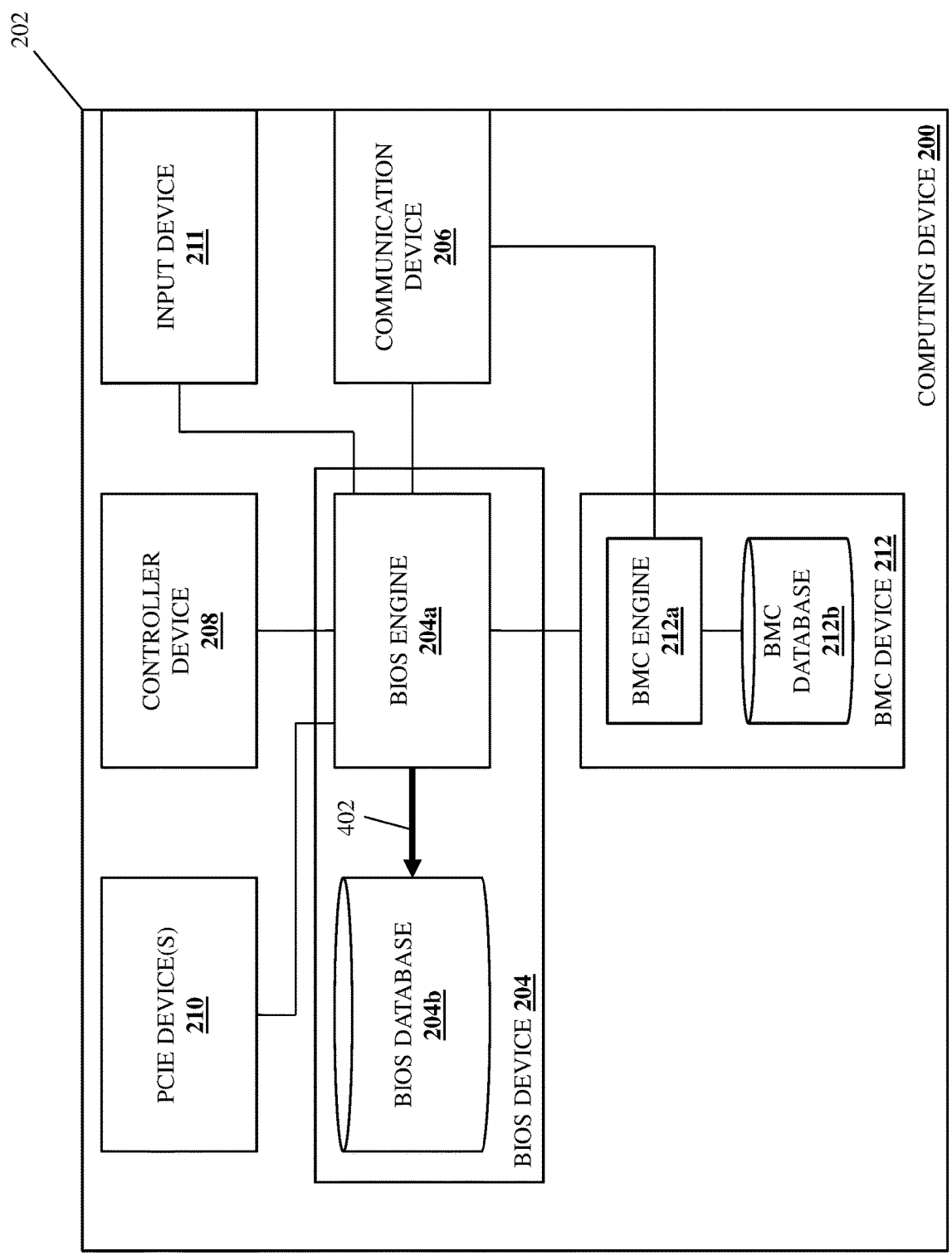
FIG. 4B is a schematic view illustrating an embodiment of the computing device of FIG. 2 operating during the method of FIG. 3.

The method 300 begins at block 302 where a BIOS device enters a BIOS setup environment. With reference to FIGS. 4A and 4B, in an embodiment of block 302, the BIOS engine 204a in the BIOS device 204 may perform BIOS setup environment instruction receiving operations 400 that may include receiving an instruction to enter a BIOS setup environment. As will be appreciated by one of skill in the art in possession of the present disclosure, the BIOS engine 204a may be instructed to provide the computing device 200 in a BIOS setup environment in response to, for example, a user of the computing device 200 pressing the "F2" key on the input device 211 during boot operations (e.g., a Power-On Self-Test (POST)) or other initialization operations that would be apparent to one of skill in the art in possession of the present disclosure. In response to receiving the instruction to enter the BIOS setup environment, the BIOS engine 204a in the BIOS device 204 will enter the BIOS setup environment and may provide a BIOS setup Graphical User Interface (GUI) for display to the user that allows the user to make the component device modifications described below, as well as perform any of a variety of other BIOS setup operations that would be apparent to one of skill in the art in possession of the present disclosure. However, while particular techniques for providing the computing device 200 and BIOS device 204 in a BIOS setup environment have been described, one of skill in the art in possession of the present disclosure will appreciate how other techniques for providing the computing device 200 and BIOS device 204 in a BIOS setup environment will fall within the scope of the present disclosure as well.

In some embodiments, in response to receiving the instruction to enter the BIOS setup environment and/or entering the BIOS setup environment, the BIOS engine 204a in the BIOS device 204 may perform component device configuration modification monitoring initiation operations 402 that may include setting a component device configuration modification monitoring flag in the BIOS database 204b that, as described below, configures the BIOS engine 204a to monitor and record or otherwise track any component device configuration modifications made to any component devices included in the computing device 200 while in the BIOS setup environment. However, while a specific example has been provided, one of skill in the art in possession of the present disclosure will appreciate how the tracking of component device configuration modifications made to component devices in a computing device while in a BIOS setup environment may be initiated in a variety of manners that will fall within the scope of the present disclosure as well.

The method 300 then proceeds to block 304 where the BIOS device detects one or more component device configuration modifications to a configuration of a component device while in the BIOS setup environment. In an embodiment, at block 304 and while in the BIOS setup environment, the BIOS engine 204a may perform component device configuration modification operations on component devices in the computing device 200. For example, a user of the computing device 200 may use the BIOS setup GUI provided by the BIOS engine 204a in the BIOS device 204 during the BIOS setup environment to select a "current"/first configuration of a component device in the computing device 200, provide a modification of that "current"/first configuration to provide a "new"/second configuration, and then apply and/or save that "new"/second configuration for the component device such that BIOS engine 204a commits that "new"/second configuration to that component device.

In a specific example, in response to a user applying and/or saving a "new"/second configuration for a component device in the BIOS setup environment as discussed above, the BIOS engine 204a will call a "RouteConfig( )" operation using a "HIIConfigRouting" driver in the BIOS device 204 that then uses HII interfaces between the BIOS device 204 and that component device to route the "new"/second configuration to that component device in order to reconfigure that component device with that "new"/second configuration. However, while a particular technique for reconfiguring a component device has been described, one of skill in the art in possession of the present disclosure will appreciate how component devices may be reconfigured in a variety of manners that will fall within the scope of the present disclosure as well.

Figure 5:
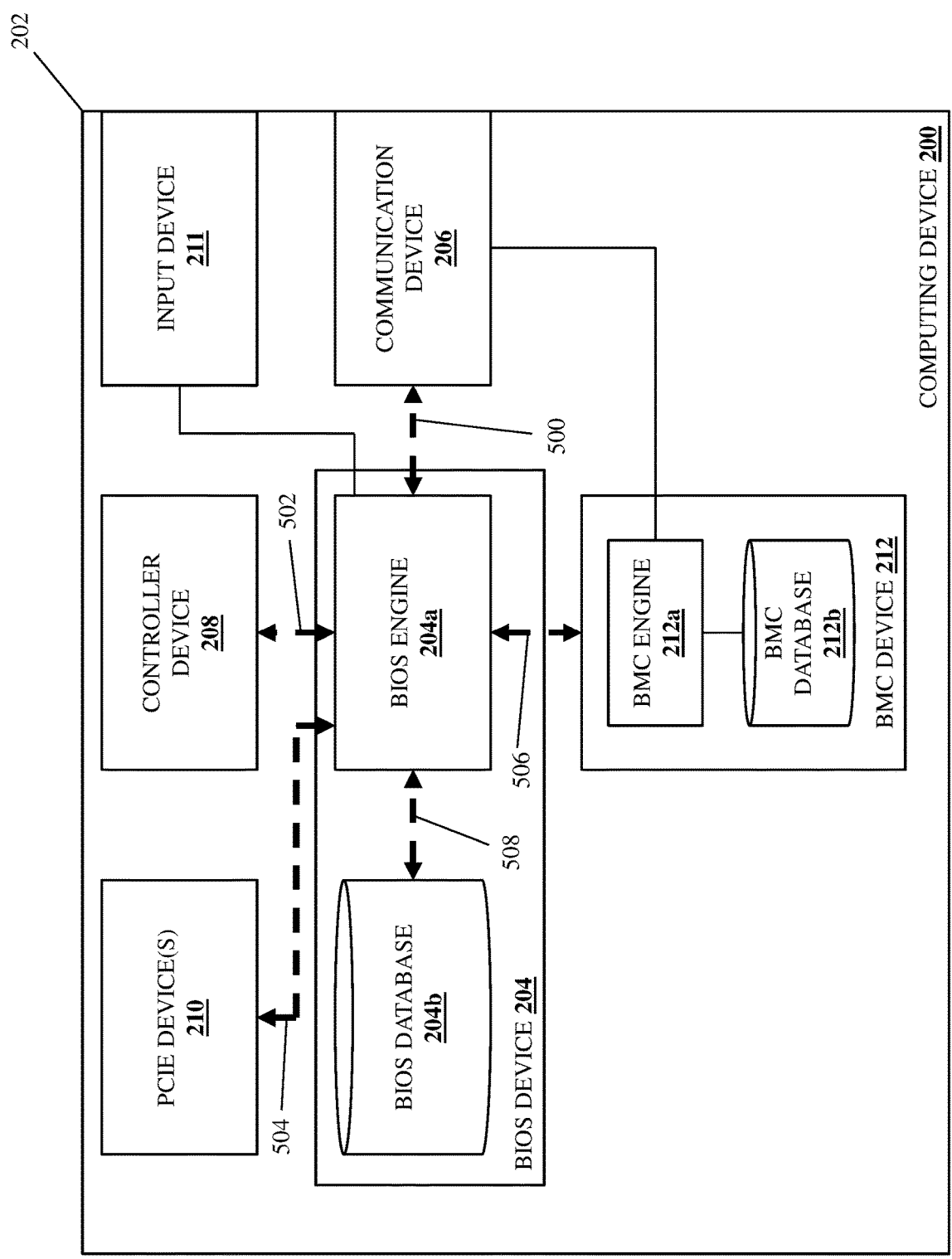
FIG. 5 is a schematic view illustrating an embodiment of the computing device of FIG. 2 operating during the method of FIG. 3.

With reference to FIG. 5, the component device configuration modification operations performed by the BIOS engine 204a in the BIOS device 204 at block 304 may include communication device configuration modification operations 500 that provide for the modification of the configuration/reconfiguring of the communication device 206 similarly as described above. To provide a specific example, the modification of the configuration of the communication device 206 may include modification of any of a variety of NIC configuration attributes (e.g., from a first NIC device configuration attribute value prior to the modification to a second NIC device configuration attribute value subsequent to the modification) that one of skill in the art in possession of the present disclosure would recognize as providing for the reconfiguration of a NIC device that provides the communication device 206.

As also illustrated in FIG. 5, the component device configuration modification operations performed by the BIOS engine 204a in the BIOS device 204 at block 304 may include controller device configuration modification operations 502 that provide for the modification of the configuration/reconfiguring of the controller device 206 similarly as described above. To provide a specific example, the modification of the configuration of the controller device 206 may include modification of any of a variety of PERC configuration attributes (e.g., from a first PERC device configuration attribute value prior to the modification to a second PERC device configuration attribute value subsequent to the modification) that one of skill in the art in possession of the present disclosure would recognize as providing for the reconfiguration of a PERC device that provides the controller device 208.

As also illustrated in FIG. 5, the component device configuration modification operations performed by the BIOS engine 204a in the BIOS device 204 at block 304 may include PCIe device configuration modification operations 504 that provide for the modification of the configuration/reconfiguring of any of the PCIe device(s) 210 similarly as described above. To provide a specific example, the modification of the configuration of the PCIe device(s) 210 may include modification of any of a variety of NVMe storage device configuration attributes (e.g., from a first NVMe storage device configuration attribute value prior to the modification to a second NVMe storage device configuration attribute value subsequent to the modification) that one of skill in the art in possession of the present disclosure would recognize as providing for the reconfiguration of a NVMe storage device that provides one of the PCIe device(s) 210.

As also illustrated in FIG. 5, the component device configuration modification operations performed by the BIOS engine 204a in the BIOS device 204 at block 304 may include BMC device configuration modification operations 506 that provide for the modification of the configuration/reconfiguring of BMC device 212 similarly as described above. To provide a specific example, the modification of the configuration of the BMC device 206 may include modification of any of a variety of iDRAC configuration attributes (e.g., from a first iDRAC device configuration attribute value prior to the modification to a second iDRAC device configuration attribute value subsequent to the modification) that one of skill in the art in possession of the present disclosure would recognize as providing for the reconfiguration of an iDRAC device that provides the BMC device 212.

Furthermore, the component device configuration modification operations performed by the BIOS engine 204a in the BIOS device 204 at block 304 may include BIOS subsystem configuration modification operations 506 that provide for the modification of the configuration/reconfiguring of a BIOS subsystem in the BIOS device 212, which is illustrated in FIG. 5 as the modification of BIOS settings stored in the BIOS database 204b of the BIOS device 204, but that one of skill in the art in possession of the present disclosure will appreciate may include the modification of any of a variety of BIOS subsystems that may be enabled via the BIOS setup GUI and/or while in the BIOS setup environment while remaining within the scope of the present disclosure as well. To provide a specific example, the modification of the configuration of the BIOS subsystem in the BIOS device 204 may include modification of any of a variety of BIOS device configuration attributes (e.g., from a first BIOS device configuration attribute value prior to the modification to a second BIOS device configuration attribute value subsequent to the modification) that one of skill in the art in possession of the present disclosure would recognize as providing for the reconfiguration of the BIOS device 204. However, while particular component device configuration modifications to particular component devices have been described, one of skill in the art in possession of the present disclosure will appreciate how configurations of component devices may be modified in a variety of manners that will fall within the scope of the present disclosure as well.

Figure 6:
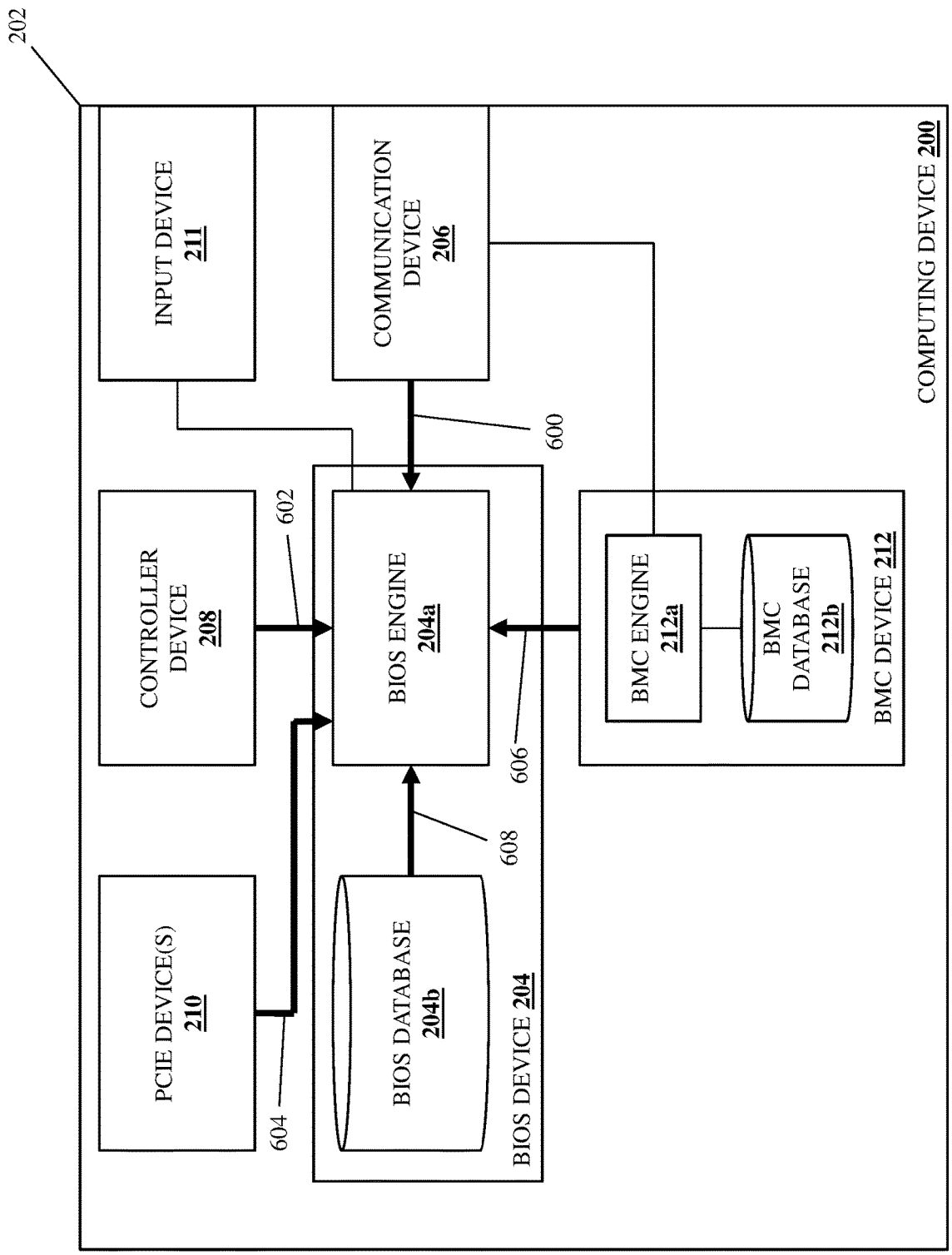
FIG. 6 is a schematic view illustrating an embodiment of the computing device of FIG. 2 operating during the method of FIG. 3.

The method 300 then proceeds to block 306 where the BIOS device generates component device configuration modification information for the component device configuration modification(s). With reference to FIG. 6, in an embodiment of block 306, the BIOS engine 204a in the BIOS device 204 may perform component device configuration modification information generation operations that may include generating component device configuration modification information for any component device configuration modifications detected at block 304. For example, in response to detecting a component device configuration modification to the configuration of a component device at block 304, the BIOS engine 204a may retrieve component device configuration modification information from that component device that includes a component device identifier (e.g., a Fully Qualified Device Descriptor (FQDD) for that component device) and, for each configuration attribute that was modified to provide the component device configuration modification to the configuration of that component device: a respective configuration attribute identifier for that configuration attribute, a first configuration attribute value of that configuration attribute prior to the modification of that configuration attribute, and a second configuration attribute value of that configuration attribute subsequent to the modification of that configuration attribute, and may store that component device configuration modification information in a BIOS cache included in the BIOS device 204.

With reference to FIG. 6, the component device configuration modification information generation operations performed by the BIOS engine 204a in the BIOS device 204 at block 306 may include communication device configuration modification information generation operations 600 that provide for the generation of configuration modification information for the communication device 206 similarly as described above. To provide a specific example, the generation of NIC device configuration modification information for a NIC device that provides the communication device 206 may include retrieving a NIC device identifier (e.g., an FQDD for the NIC device) and, for each NIC device configuration attribute that was modified to provide a NIC device configuration modification to the configuration of the NIC device: a respective NIC device configuration attribute identifier for that NIC device configuration attribute, a first NIC device configuration attribute value of that NIC device configuration attribute prior to the modification of that NIC device configuration attribute, and a second NIC device configuration attribute value of that NIC device configuration attribute subsequent to the modification of that NIC device configuration attribute, and may store that NIC device configuration modification information in a BIOS cache included in the BIOS device 204.

As also illustrated in FIG. 6, the component device configuration modification information generation operations performed by the BIOS engine 204a in the BIOS device 204 at block 306 may include controller device configuration modification information generation operations 602 that provide for the generation of configuration modification information for the controller device 208 similarly as described above. To provide a specific example, the generation of PERC device configuration modification information for a PERC device that provides the controller device 208 may include retrieving a PERC device identifier (e.g., an FQDD for the PERC device) and, for each PERC device configuration attribute that was modified to provide the PERC device configuration modification to the configuration of the PERC device: a respective PERC device configuration attribute identifier for that PERC device configuration attribute, a first PERC device configuration attribute value of that PERC device configuration attribute prior to the modification of that PERC device configuration attribute, and a second PERC device configuration attribute value of that PERC device configuration attribute subsequent to the modification of that PERC device configuration attribute, and may store that PERC device configuration modification information in a BIOS cache included in the BIOS device 204.

As also illustrated in FIG. 6, the component device configuration modification information generation operations performed by the BIOS engine 204a in the BIOS device 204 at block 306 may include PCIe device configuration modification information generation operations 604 that provide for the generation of configuration modification information for any of the PCIe device(s) 210 similarly as described above. To provide a specific example, the generation of NVMe storage device configuration modification information for an NVMe storage device that provides one of the PCIe device(s) 210 may include retrieving an NVMe storage device identifier (e.g., an FQDD for the NVMe storage device) and, for each NVMe storage device configuration attribute that was modified to provide the NVMe storage device configuration modification to the configuration of the NVMe storage device: a respective NVMe storage device configuration attribute identifier for that NVMe storage device configuration attribute, a first NVMe storage device configuration attribute value of that NVMe storage device configuration attribute prior to the modification of that NVMe storage device configuration attribute, and a second NVMe storage device configuration attribute value of that NVMe storage device configuration attribute subsequent to the modification of that NVMe storage device configuration attribute, and may store that NVMe storage device configuration modification information in a BIOS cache included in the BIOS device 204.

As also illustrated in FIG. 6, the component device configuration modification information generation operations performed by the BIOS engine 204a in the BIOS device 204 at block 306 may include BMC device configuration modification information generation operations 606 that provide for the generation of configuration modification information for the BMC device 212 similarly as described above. To provide a specific example, the generation of iDRAC device configuration modification information for an iDRAC device that provides the BMC device 212 may include retrieving an iDRAC device identifier (e.g., an FQDD for the iDRAC device) and, for each iDRAC device configuration attribute that was modified to provide the iDRAC device configuration modification to the configuration of the iDRAC device: a respective iDRAC device configuration attribute identifier for that iDRAC device configuration attribute, a first iDRAC device configuration attribute value of that iDRAC device configuration attribute prior to the modification of that iDRAC device configuration attribute, and a second iDRAC device configuration attribute value of that iDRAC device configuration attribute subsequent to the modification of that iDRAC device configuration attribute, and may store that iDRAC device configuration modification information in a BIOS cache included in the BIOS device 204.

Furthermore, the component device configuration modification information generation operations performed by the BIOS engine 204a in the BIOS device 204 at block 304 may include BIOS subsystem configuration modification information generation operations 608 that provide for the generation of configuration modification information for the BIOS device 204 similarly as described above, which is illustrated in FIG. 6 as the retrieval of BIOS settings stored in the BIOS database 204b of the BIOS device 204, but that one of skill in the art in possession of the present disclosure will appreciate may include the retrieval of BIOS settings and other BIOS information from any of a variety of BIOS subsystems while remaining within the scope of the present disclosure as well. To provide a specific example, the generation of BIOS device configuration modification information for the BIOS device 204 may include retrieving a BIOS device identifier (e.g., an FQDD for the BIOS device 204) and, for each BIOS device configuration attribute that was modified to provide the BIOS device configuration modification to the configuration of the BIOS device 204: a respective BIOS device configuration attribute identifier for that BIOS device configuration attribute, a first BIOS device configuration attribute value of that BIOS device configuration attribute prior to the modification of that BIOS device configuration attribute, and a second BIOS device configuration attribute value of that BIOS device configuration attribute subsequent to the modification of that BIOS device configuration attribute, and may store that BIOS device configuration modification information in a BIOS cache included in the BIOS device 204. However, while the generation of particular component device configuration modification information for particular component devices has been described, one of skill in the art in possession of the present disclosure will appreciate how component device configuration modification information for component devices may be generated in a variety of manners that will fall within the scope of the present disclosure as well.

The method 300 then proceeds to block 308 where the BIOS device provides the component device configuration modification information for storage in a non-volatile storage device. In an embodiment, following the completion of the component device configuration modifications to the configuration(s) of the component device(s) in the computing device 200, a user of the computing device 200 may provide a request to the BIOS engine 204a in the BIOS device 204 to exit the BIOS setup environment via, for example, the BIOS setup GUI discussed above. In response to receiving that request, the BIOS engine 204a may cause the computing device to exit the BIOS setup environment and, in response to the exiting of the BIOS setup environment, the BIOS engine 204a may perform component device configuration modification information non-volatile storage operations that include providing the component device configuration modification information generated at block 306 for storage in a non-volatile storage device that is accessible to the BIOS engine 204a. Following the component device configuration modification information non-volatile storage operations, the BIOS engine 204a may clear the component device configuration modification monitoring flag in the BIOS database 204b that was set at block 302.

Figure 7A:
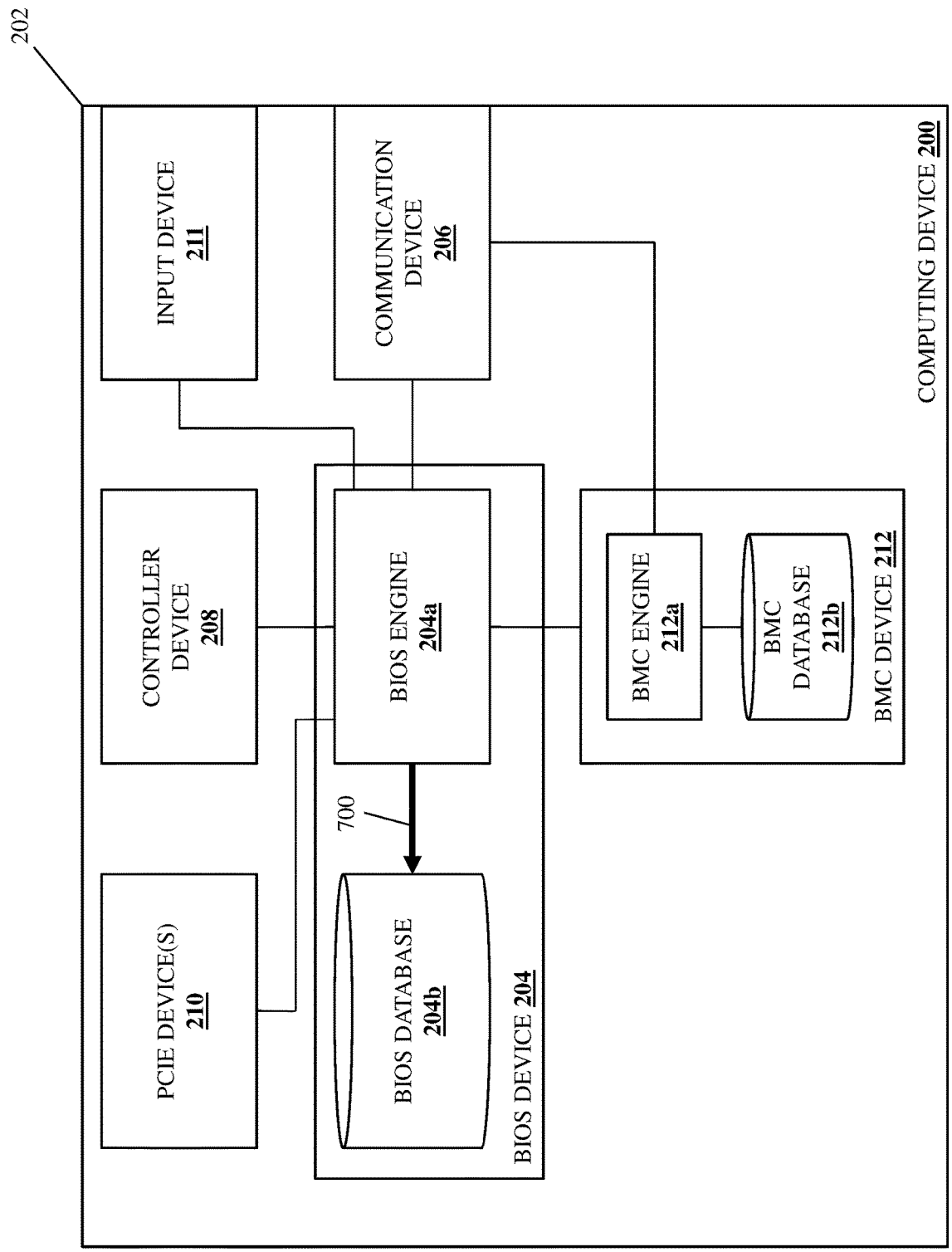
FIG. 7A is a schematic view illustrating an embodiment of the computing device of FIG. 2 operating during the method of FIG. 3.

With reference to FIG. 7A, in some embodiments of block 308, the BIOS engine 204a in the BIOS device 204 may perform component device configuration modification information non-volatile storage operations 700 that may include retrieving the component device configuration modification information that was generated and stored in the BIOS cache at block 306, and storing that component device configuration modification information in the BIOS database 204a that may be provided by a non-volatile storage device that is included in the BIOS storage system in the BIOS device 204. However, while illustrated and described as being stored in the BIOS database 204b, one of skill in the art in possession of the present disclosure will appreciate that the component device configuration modification information may be stored in any non-volatile storage device included in the BIOS device 204 while remaining within the scope of the present disclosure as well. As such, some embodiment of the present disclose may include the BIOS device 204 storing the component device configuration modification information internally in the non-volatile storage device.

Figure 7B:
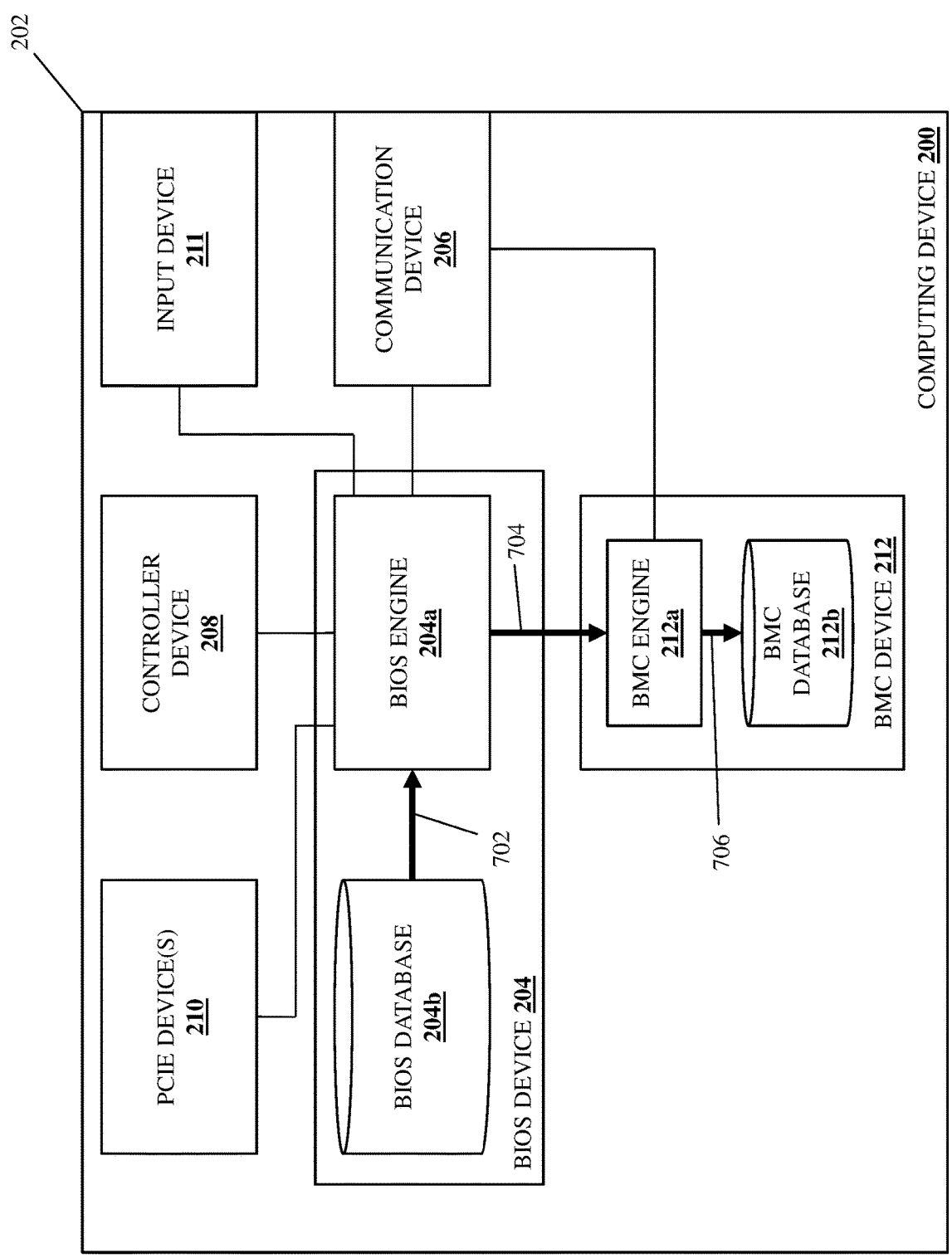
FIG. 7B is a schematic view illustrating an embodiment of the computing device of FIG. 2 operating during the method of FIG. 3.

With reference to FIG. 7B, in some embodiments of block 308, the BIOS engine 204a in the BIOS device 204 may perform component device configuration modification information non-volatile storage operations that may include providing the component device configuration modification information generated at block 306 for storage in a non-volatile storage device included in the BMC device 212. For example, as illustrated in FIG. 7B, the BIOS engine 204a in the BIOS device 204 may perform component device configuration modification information retrieval operations 702 that may include retrieving the component device configuration modification information from the BIOS database 204b (e.g., that may be provided by a non-volatile storage device that is included in the BIOS storage system in the BIOS device 204 as discussed in the example above). However, one of skill in the art in possession of the present disclosure will appreciate how, rather than storing the component device configuration modification information in the non-volatile storage device that is included in the BIOS storage system in the BIOS device 204 at block 306, and then retrieving that component device configuration modification information from that non-volatile storage device at block 308, at block 308 the BIOS engine 204a may instead retrieve the component device configuration modification information that was generated and stored in the BIOS cache at block 306 while remaining within the scope of the present disclosure as well.

The BIOS engine 204a may then perform component device configuration modification information provisioning operations 704 that may include transmitting the component device configuration modification information to the BMC engine 212a in the BMC device 212. In response to receiving the component device configuration modification information, the BMC engine 212a in the BMC device 212 may perform component device configuration modification information non-volatile storage operations 706 that may include storing the component device configuration modification information in the BMC database 212b (e.g., an auditing log such as a "lifecycle" log in the BMC database 212b) that may be provided by a non-volatile storage device in the BMC storage system included in the BMC storage device 212. However, while a specific example of the provisioning of component device configuration modification information for external storage (i.e., external to the BIOS device 204) has been illustrated and described, one of skill in the art in possession of the present disclosure will appreciate how other external storage locations may be utilized by the BIOS device 204 while remaining within the scope of the present disclosure as well.

Figure 7C:
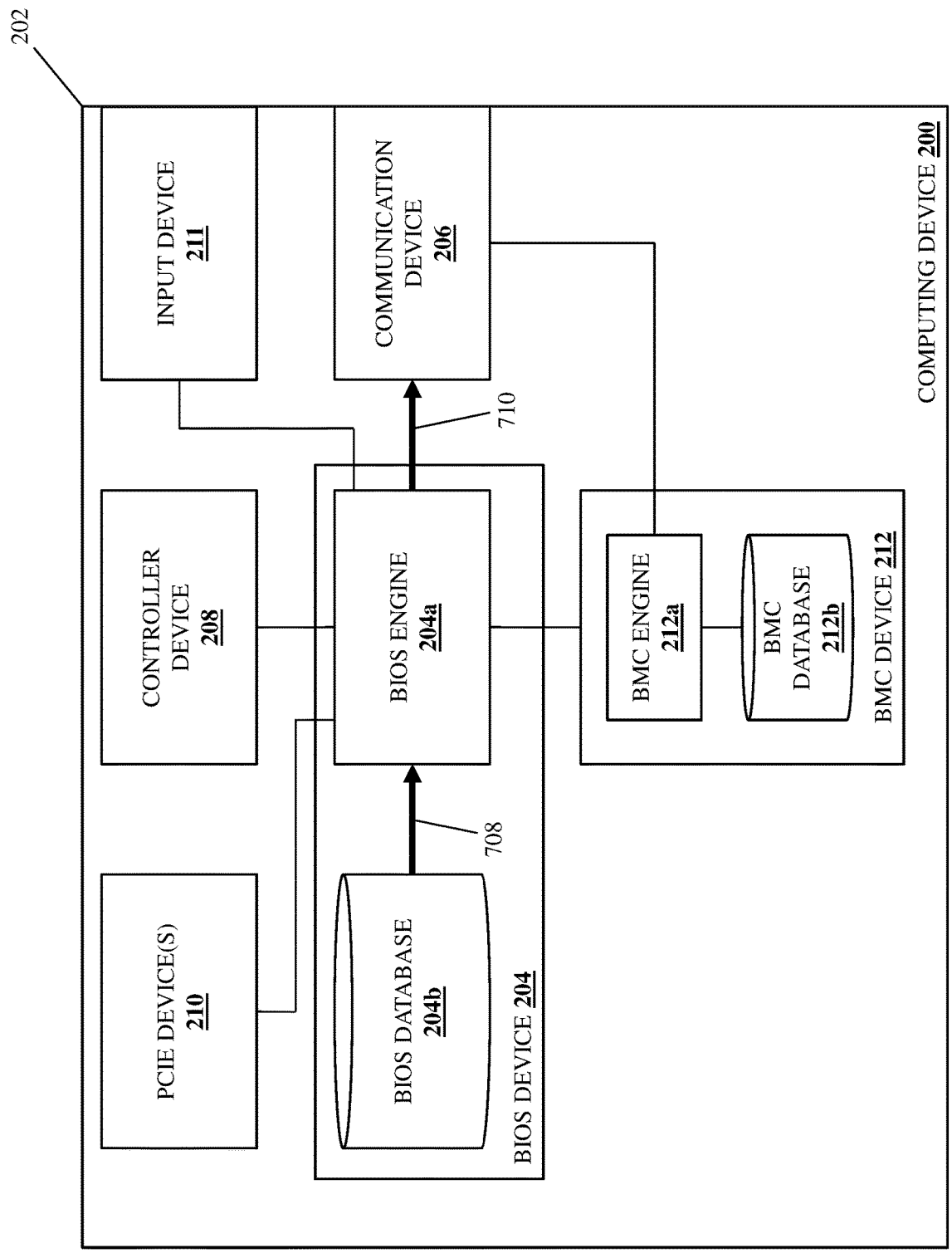
FIG. 7C is a schematic view illustrating an embodiment of the computing device of FIG. 2 operating during the method of FIG. 3.

For example, with reference to FIG. 7C, in some embodiments of block 308 the BIOS engine 204a in the BIOS device 204 may perform component device configuration modification information non-volatile storage operations that may include providing the component device configuration modification information generated at block 306 for storage in a non-volatile storage device included in a network-connected storage device (not illustrated) that is coupled to the communication device 206 via a network. For example, as illustrated in FIG. 7C, the BIOS engine 204a in the BIOS device 204 may perform component device configuration modification information retrieval operations 708 that may include retrieving the component device configuration modification information from the BIOS database 204b (e.g., that may be provided by a non-volatile storage device that is included in the BIOS storage system in the BIOS device 204 as discussed in the example above). However, one of skill in the art in possession of the present disclosure will appreciate how, rather than storing the component device configuration modification information in the non-volatile storage device that is included in the BIOS storage system in the BIOS device 204 at block 306, and then retrieving that component device configuration modification information from that non-volatile storage device at block 308, at block 308 the BIOS engine 204a may instead retrieve the component device configuration modification information that was generated and stored in the BIOS cache at block 306 while remaining within the scope of the present disclosure as well.

The BIOS engine 204a may then perform component device configuration modification information provisioning operations 710 that may include transmitting the component device configuration modification information via the communication device 206 and via a network to a network-connected storage device (not illustrated). While not illustrated, one of skill in the art in possession of the present disclosure will appreciate how, in response to receiving the component device configuration modification information via the network, the network-connected storage device may perform component device configuration modification information non-volatile storage operations that may include storing the component device configuration modification information in a non-volatile storage device in the network-connected storage device. As such, the component device configuration modification information may be provided for storage in a wide variety of non-volatile storage devices using a variety of non-volatile storage techniques while remaining within the scope of the present disclosure as well.

The method 300 then proceeds to decision block 310 where it is determined whether a component device configuration audit request has been received. In an embodiment, at decision block 310 and using the examples above in which the component device configuration modification information is stored in the non-volatile storage device in the BIOS device 204, the BIOS engine 204a in the BIOS device 204 may monitor for a component device configuration audit request that may be provided by a user via the input device 211; by the user via a network and the communication device 206; by a user via a network, the communication device 206, and the BMC device 212; and/or via any other manner that would be apparent to one of skill in the art in possession of the present disclosure. In another embodiment, at decision block 310 and using the examples above in which the component device configuration modification information is stored in the non-volatile storage device in the BMC device 212, the BMC engine 212a in the BMC device 212 may monitor for a component device configuration audit request that may be provided by a user via a network and the communication device 206, and/or via any other manner that would be apparent to one of skill in the art in possession of the present disclosure. In another embodiment, at decision block 310 and using the examples above in which the component device configuration modification information is stored in the non-volatile storage device in the network-connected storage device (not illustrated), the network-connected storage device may monitor for a component device configuration audit request that may be provided by a user via a network, and/or via any other manner that would be apparent to one of skill in the art in possession of the present disclosure.

Furthermore, while the component device configuration audit request is described as being received from a user via the input devices, communication devices, and/or BMC devices discussed above, one of skill in the art in possession of the present disclosure will appreciate how such component device configuration audit requests may be automated and provided by auditing systems and/or other monitoring systems that provide for periodic retrieval and analysis of component device configuration modification information. As such, while particular component device configuration audit requests have been described, one of skill in the art in possession of the present disclosure will appreciate how the component device configuration modification information stored in the non-volatile storage device as discussed above may be requested in a variety of manners by a variety of entities and for a variety of purposes that will fall within the scope of the present disclosure as well.

If, at decision block 310, it is determined that a component device configuration audit request has not been received, the method 300 returns to decision block 310. As such, the method 300 may loop such that the BIOS engine 204a in the BIOS device 204, the BMC engine 212a in the BMC device 212, and/or the network-connected storage device continue to monitor for component device configuration audit request(s) for the component device configuration modification information until a component device configuration audit request is received.

If at decision block 310, it is determined that a component device configuration audit request has been received, the method 300 proceeds to block 312 where access is provided to the component device configuration modification information in the non-volatile storage device. With reference to FIG. 8A, in an embodiment of block 312 and using the examples above in which the component device configuration modification information is stored in the non-volatile storage device in the BIOS device 204, in response to receiving the component device configuration audit request the BIOS engine 204a in the BIOS device 204 may perform component device configuration modification information provisioning operations 800 that may include retrieving the component device configuration modification information from the BIOS database 204b provided by the non-volatile storage device in the BIOS storage system of the BIOS device 204, and transmitting that component device configuration modification information via the communication device 206 (e.g., to a display device coupled to the communication device 206 when the user requested the component device configuration modification information via the input device 211, via a network and to a user device that the user used transmit the request for the component device configuration modification information, etc.).

Furthermore, while not illustrated, one of skill in the art in possession of the present disclosure will appreciate how the BIOS engine 204a may transmit the component device configuration modification information via the BMC device 212, the communication device 206, and a network to a user device that the user used transmit the request for the component device configuration modification information while remaining within the scope of the present disclosure as well.

Figure 8B:
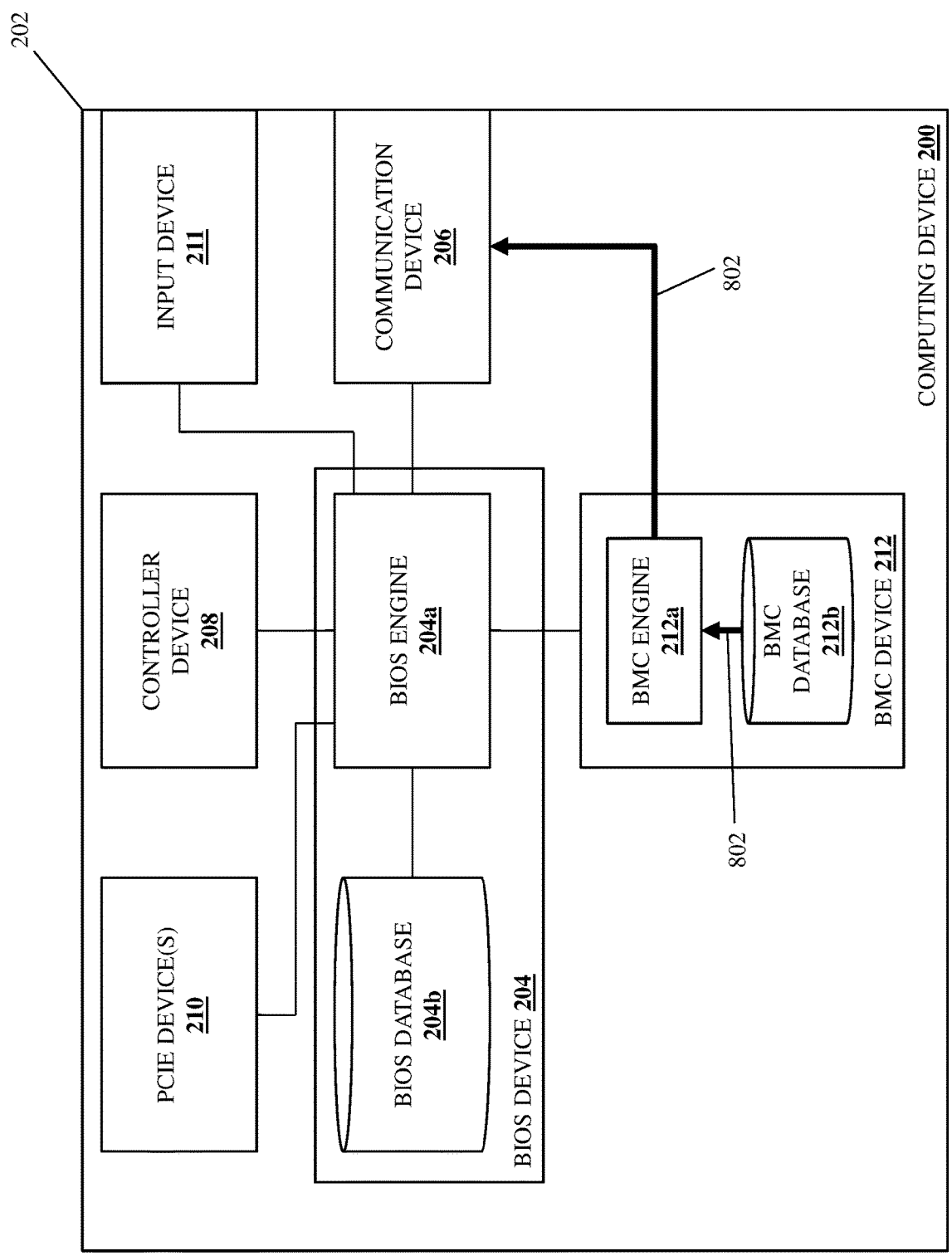
FIG. 8B is a schematic view illustrating an embodiment of the computing device of FIG. 2 operating during the method of FIG. 3.

With reference to FIG. 8B, in an embodiment of block 312 and using the examples above in which the component device configuration modification information is stored in the non-volatile storage device in the BMC device 212, in response to receiving the component device configuration audit request the BMC engine 212a in the BMC device 212 may perform component device configuration modification information provisioning operations 802 that may include retrieving the component device configuration modification information from the BMC database 212b provided by the non-volatile storage device in the BMC storage system, and transmitting that component device configuration modification information via the communication device 206 (and via a network to a user device that the user used transmit the request for the component device configuration modification information, etc.).

Furthermore, while not illustrated, in an embodiment of block 312 and using the examples above in which the component device configuration modification information is stored in the non-volatile storage device in the network-connected storage device, in response to receiving the component device configuration audit request the network-connected storage device may perform component device configuration modification information provisioning operations that may include retrieving the component device configuration modification information from the non-volatile storage device in the network-connected storage device, and transmitting that component device configuration modification information via a network to a user device that the user used transmit the request for the component device configuration modification information). As will be appreciated by one of skill in the art in possession of the present disclosure, in any of the embodiments described above, the user, auditing system, and/or monitoring system that requested the component device configuration modification information may use any of a variety of auditing or other analysis techniques with that component device configuration modification information to audit and/or analyze any component device configuration changes made by a user while the computing device 200 was in the BIOS setup environment.

Thus, systems and methods have been described that provide a BIOS device that, when modifications are made to the configuration of component device(s) while in a BIOS setup environment of the computing device, generates component device configuration modification information for those modifications and provides it for storage in a non-volatile memory device. For example, the BIOS setup environment configuration modification audit system of the present disclosure includes a BIOS device that is included in a computing device and that is coupled to a component device in the computing device. The BIOS device enters a BIOS setup environment for the computing device and, while in the BIOS setup environment, detects component device configuration modification(s) to a configuration of the component device. The BIOS device then generates component device configuration modification information for the component device configuration modification(s) to the configuration of the component device, and provides the component device configuration modification information for storage in a non-volatile storage device that may be included in the BIOS device, a Baseboard Management Controller (BMC) device coupled to the BIOS device, or a network-connected device coupled to the BIOS device, any of which may provide access to that component device configuration modification information in response to a component device configuration audit request. As such, modifications made during a BIOS setup environment to configurations of component devices in a computing device may be audited to identify any details about those configuration modifications, which may be particularly useful in situations where the user making such modifications is not the "owner" of the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) setup environment configuration modification audit system, comprising:
a computing device;
a component device that is included in the computing device;
a Basic Input/Output System (BIOS) device that is included in the computing device and that is coupled to the component device, wherein the BIOS device is configured to:
enter a BIOS setup environment for the computing device;
detect, while in the BIOS setup environment, at least one component device configuration modification to a first configuration of the component device to provide a second configuration of the component device;
generate component device configuration modification information for the at least one component device configuration modification that identifies the component device and the at least one component device configuration modification that modified the first configuration to provide the second configuration; and
provide the component device configuration modification information for storage in a non-volatile storage device.

2. The system of claim 1, wherein the non-volatile storage device is included in the BIOS device, and wherein the BIOS device is configured to:
 provide the component device configuration modification information for storage in the non-volatile storage device that is included in the BIOS device;
 receive a component device configuration audit request; and
 provide, in response to the component device configuration audit request, access to the component device configuration modification information in the non-volatile storage device that is included in the BIOS device.

3. The system of claim 1, wherein the non-volatile storage device is included in a Baseboard Management Controller (BMC) device that is coupled to the BIOS device, and wherein the BIOS device is configured to:
 provide the component device configuration modification information for storage in the non-volatile storage device that is included in the BMC device that is coupled to the BIOS device, and wherein the BMC device is configured to:
  receive a component device configuration audit request; and
  provide, in response to the component device configuration audit request, access to the component device configuration modification information in the non-volatile storage device that is included in the BMC device that is coupled to the BIOS device.

4. The system of claim 1, wherein the component device is one of:
 a BIOS subsystem in the BIOS device;
 a communication device that is included in the computing device and coupled to the BIOS device;
 a controller device that is included in the computing device and coupled to the BIOS device; and/or
 a Peripheral Component Interconnect express (PCIe) device that is included in the computing device and coupled to the BIOS device.

5. The system of claim 1, wherein the BIOS device is configured to:
 set, in response to entering the BIOS setup environment, a component device configuration modification monitoring flag;
 determine, while in the BIOS setup environment, that the first configuration of the component device has been modified to provide the second configuration of the component device to provide the at least one component device configuration modification;
 generate, while in the BIOS setup environment and in response to the first configuration of the component device being modified to provide the second configuration of the component device while the component device configuration modification monitoring flag is set, the component device configuration modification information and provide the component device configuration modification information for storage in the non-volatile storage device to monitor the at least one component device configuration modification;
 exit the BIOS setup environment; and
 clear, in response to exiting the BIOS setup environment, the component device configuration modification monitoring flag.

6. The system of claim 1, wherein the component device configuration modification information includes a component device identifier that identifies the component device and, for each configuration attribute that was modified to provide the at least one component device configuration modification to the first configuration of the component device to provide the second configuration of the component device: a respective configuration attribute identifier for that configuration attribute, a first configuration attribute value of that configuration attribute prior to the modification of that configuration attribute, and a second configuration attribute value of that configuration attribute subsequent to the modification of that configuration attribute.

7. An Information Handling System (IHS), comprising:
 a Basic Input/Output System (BIOS) processing system; and
 a BIOS memory system that is coupled to the BIOS processing system and that includes instructions, wherein the BIOS processing system is configured to execute the instruction to:
  enter a BIOS setup environment;
  detect, while in the BIOS setup environment, at least one component device configuration modification to a first configuration of a component device that is coupled to the BIOS processing system to provide a second configuration of the component device;
  generate component device configuration modification information for the at least one component device configuration modification that identifies the component device and the at least one component device configuration modification that modified the first configuration to provide the second configuration; and
  provide the component device configuration modification information for storage in a non-volatile storage device.

8. The IHS of claim 7, wherein the non-volatile storage device is included in a BIOS device that provides the BIOS processing system and the BIOS memory system, and wherein the BIOS engine is configured to execute the instruction to:
 provide the component device configuration modification information for storage in the non-volatile storage device that is included in the BIOS device that provides the BIOS processing system and the BIOS memory system;
 receive a component device configuration audit request; and
 provide, in response to the component device configuration audit request, access to the component device configuration modification information in the non-volatile storage device that is included in the BIOS device that provides the BIOS processing system and the BIOS memory system.

9. The IHS of claim 7, wherein the non-volatile storage device is included in a Baseboard Management Controller (BMC) device that is coupled to the BIOS processing system and that is configured to provide access to the component device configuration modification information in the non-volatile storage device in response to receiving a component device configuration audit request, and wherein the BIOS engine is configured to:
 provide the component device configuration modification information for storage in the non-volatile storage device that is included in the BMC device.

10. The IHS of claim 7, wherein the component device is provided by one of:
 a BIOS subsystem that is included in a BIOS device that provides the BIOS processing system and the BIOS memory system;
 a communication device that is coupled to the BIOS processing system;

a controller device that is coupled to the BIOS processing system; or a Peripheral Component Interconnect express (PCIe) device that is coupled to the BIOS processing system.

11. The IHS of claim 7, wherein the BIOS engine is configured to execute the instruction to:

set, in response to entering the BIOS setup environment, a component device configuration modification monitoring flag;

determine, while in the BIOS setup environment, that the first configuration of the component device has been modified to provide the second configuration of the component device to provide the at least one component device configuration modification;

generate, while in the BIOS setup environment and in response to the first configuration of the component device being modified to provide the second configuration of the component device while the component device configuration modification monitoring flag is set, the component device configuration modification information and provide the component device configuration modification information for storage in the non-volatile storage device to monitor the at least one component device configuration modification;

exit the BIOS setup environment; and clear, in response to exiting the BIOS setup environment, the component device configuration modification monitoring flag.

12. The IHS of claim 7, wherein the component device configuration modification information includes a component device identifier that identifies the component device and, for each configuration attribute that was modified to provide the at least one component device configuration modification to the first configuration of the component device to provide the second configuration of the component device: a respective configuration attribute identifier for that configuration attribute, a first configuration attribute value of that configuration attribute prior to the modification of that configuration attribute, and a second configuration attribute value of that configuration attribute subsequent to the modification of that configuration attribute.

13. The IHS of claim 7, wherein the BIOS engine is configured to execute the instruction to:

perform the at least one component device configuration modification to the first configuration of the component device to provide the second configuration of the component device via at least one Human Interface Infrastructure (HII) subsystem.

14. A method for enabling audits of configuration modifications provided in an Basic Input/Output System (BIOS) setup environment of a computing device, comprising:

entering, by a BIOS device in a computing device, a BIOS setup environment for the computing device;

detecting, by the BIOS device while in the BIOS setup environment, at least one component device configuration modification to a first configuration of a component device in the computing device to provide a second configuration of the component device;

generating, by the BIOS device, component device configuration modification information for the at least one component device configuration modification that identifies the component device and the at least one component device configuration modification that modified the first configuration to provide the second configuration; and providing, by the BIOS device, the component device configuration modification information for storage in a non-volatile storage device.

15. The method of claim 14, wherein the non-volatile storage device is included in the BIOS device, and wherein the method further comprises:

providing, by the BIOS device, the component device configuration modification information for storage in the non-volatile storage device that is included in the BIOS device;

receiving, by the BIOS device, a component device configuration audit request; and providing, by the BIOS device in response to the component device configuration audit request, access to the component device configuration modification information in the non-volatile storage device that is included in the BIOS device.

16. The method of claim 14, wherein the non-volatile storage device is included in a Baseboard Management Controller (BMC) device that is coupled to the BIOS device, and wherein the method further comprises:

providing, by the BIOS device, the component device configuration modification information for storage in the non-volatile storage device that is included in the BMC device that is coupled to the BIOS device;

receiving, by the BMC device, a component device configuration audit request; and providing, by the BMC device in response to the component device configuration audit request, access to the component device configuration modification information in the non-volatile storage device that is included in the BMC device that is coupled to the BIOS device.

17. The method of claim 14, wherein the component device is one of:

a BIOS subsystem in the BIOS device;

a communication device that is included in the computing device and coupled to the BIOS device;

a controller device that is included in the computing device and coupled to the BIOS device; or a Peripheral Component Interconnect express (PCIe) device that is included in the computing device and coupled to the BIOS device.

18. The method of claim 14, further comprising:

setting, by the BIOS device in response to entering the BIOS setup environment, a component device configuration modification monitoring flag;

determining, by the BIOS device while in the BIOS setup environment, that the first configuration of the component device has been modified to provide the second configuration of the component device to provide the at least one component device configuration modification;

generating, by the BIOS device while in the BIOS setup environment and in response to the first configuration of the component device being modified to provide the second configuration of the component device while the component device configuration modification monitoring flag is set, the component device configuration modification information and provide the component device configuration modification information for storage in the non-volatile storage device to monitor the at least one component device configuration modification;

exiting, by the BIOS device, the BIOS setup environment; and clearing, by the BIOS device in response to exiting the BIOS setup environment, the component device configuration modification monitoring flag.

19. The method of claim 14, wherein the component device configuration modification information includes a component device identifier that identifies the component device and, for each configuration attribute that was modified to provide the at least one component device configuration modification to the first configuration of the component device to provide the second configuration of the component device: a respective configuration attribute identifier for that configuration attribute, a first configuration attribute value of that configuration attribute prior to the modification of that configuration attribute, and a second configuration attribute value of that configuration attribute subsequent to the modification of that configuration attribute.

20. The method of claim 14, further comprising:
performing, by the BIOS device, the at least one component device configuration modification to the first configuration of the component device to provide the second configuration of the component device via at least one Human Interface Infrastructure (HII) subsystem.

* * * * *

UNITED STATES PATENT AND TRADEMARK OFFICE
CERTIFICATE OF CORRECTION

PATENT NO. : 12,223,330 B2
APPLICATION NO. : 18/302163
DATED : February 11, 2025
INVENTOR(S) : Liu et al.

Page 1 of 1

It is certified that error appears in the above-identified patent and that said Letters Patent is hereby corrected as shown below:

In the Claims

Claim 4, Column 17, Line 35, "and/or" should read --or--

Claim 10, Column 18, Line 62, delete "provided by"

Signed and Sealed this
Eighth Day of April, 2025

Coke Morgan Stewart
*Acting Director of the United States Patent and Trademark Office*